United States Patent
Morbee et al.

(10) Patent No.: US 9,041,941 B2
(45) Date of Patent: May 26, 2015

(54) OPTICAL SYSTEM FOR OCCUPANCY SENSING, AND CORRESPONDING METHOD

(75) Inventors: Marleen Morbee, Ghent (BE); Linda Tessens, Drongen (BE)

(73) Assignee: UNIVERSITEIT GENT, Ghent (BE)

( * ) Notice: Subject to any disclaimer, the term of this patent is extended or adjusted under 35 U.S.C. 154(b) by 17 days.

(21) Appl. No.: 13/700,953

(22) PCT Filed: May 25, 2011

(86) PCT No.: PCT/EP2011/058529
§ 371 (c)(1),
(2), (4) Date: Nov. 29, 2012

(87) PCT Pub. No.: WO2011/151232
PCT Pub. Date: Dec. 8, 2011

(65) Prior Publication Data
US 2013/0070258 A1    Mar. 21, 2013

(30) Foreign Application Priority Data

May 31, 2010   (EP) .................................... 10164483
Jan. 11, 2011   (EP) .................................... 11000138

(51) Int. Cl.
| | | |
|---|---|---|
| *G01B 11/14* | (2006.01) | |
| *G01V 8/20* | (2006.01) | |
| *G08B 13/181* | (2006.01) | |
| *G08B 13/194* | (2006.01) | |
| *H05B 37/02* | (2006.01) | |

(52) U.S. Cl.
CPC ................ *G01V 8/20* (2013.01); *G08B 13/181* (2013.01); *G08B 13/194* (2013.01); *H05B 37/0227* (2013.01)

(58) Field of Classification Search
CPC ...... G01V 8/20; G08B 13/181; G08B 13/194; H05B 37/0227
USPC ........................................................... 356/614
See application file for complete search history.

(56) References Cited

U.S. PATENT DOCUMENTS

| | | | | |
|---|---|---|---|---|
| 3,972,021 | A | * | 7/1976 | Leitz et al. ................ 250/237 G |
| 4,799,243 | A | * | 1/1989 | Zepke ........................ 250/338.3 |
| 4,914,283 | A | | 4/1990 | Brinckmann et al. |
| 5,101,194 | A | * | 3/1992 | Sheffer ....................... 250/338.1 |
| 5,331,825 | A | * | 7/1994 | Kim ................................. 62/180 |
| 5,448,320 | A | * | 9/1995 | Sakai et al. .................... 396/427 |
| 5,541,414 | A | * | 7/1996 | Hori .............................. 250/349 |
| 5,587,580 | A | | 12/1996 | Venier et al. |

(Continued)

FOREIGN PATENT DOCUMENTS

EP    0 716 402 A1    6/1996

OTHER PUBLICATIONS

Michael McCarthy and Henk Muller, "Positioning with Independent Ultrasonic Beacons", Sep. 2005 (source: http://www.cs.bris.ac.uk/Publications/pub_master.jsp?id=2000430).

(Continued)

*Primary Examiner* — Michael A Lyons
(74) *Attorney, Agent, or Firm* — Workman Nydegger (57) ABSTRACT

An optical system for occupancy sensing according to the invention includes a plurality of optical line sensors, each consisting of a linear array of light sensing elements; and an optical light integrating device that integrates light from rays with incidence angles subject to geometric constraints to be sensed by a light sensing element.

13 Claims, 8 Drawing Sheets

(56) References Cited

U.S. PATENT DOCUMENTS

| | | | |
|---|---|---|---|
| 5,703,367 A * | 12/1997 | Hashimoto et al. | 250/342 |
| 5,739,753 A * | 4/1998 | Porter | 250/342 |
| 5,764,146 A * | 6/1998 | Baldwin et al. | 250/338.3 |
| 5,834,765 A | 11/1998 | Ashdown | |
| 5,866,887 A * | 2/1999 | Hashimoto et al. | 250/221 |
| 6,222,191 B1 * | 4/2001 | Myron et al. | 250/353 |
| 6,239,437 B1 * | 5/2001 | Barone | 250/353 |
| 6,690,018 B1 * | 2/2004 | Barone | 250/353 |
| 7,053,374 B2 * | 5/2006 | Barone | 250/353 |
| 7,382,895 B2 * | 6/2008 | Bramblet et al. | 382/103 |
| 7,450,735 B1 | 11/2008 | Shah et al. | |
| 7,486,193 B2 | 2/2009 | Elwell | |
| 7,683,301 B2 * | 3/2010 | Papamichael et al. | 250/205 |
| 7,705,310 B2 * | 4/2010 | Zhevelev et al. | 250/339.02 |
| 2002/0063217 A1 * | 5/2002 | Barone | 250/349 |
| 2004/0066500 A1 * | 4/2004 | Gokturk et al. | 356/4.01 |
| 2006/0062429 A1 * | 3/2006 | Ramaswamy et al. | 382/103 |
| 2006/0138329 A1 * | 6/2006 | Wu et al. | 250/342 |
| 2009/0158309 A1 | 6/2009 | Moon et al. | |
| 2010/0237695 A1 * | 9/2010 | Covaro et al. | 307/19 |

OTHER PUBLICATIONS

Paramvir Bahl and Venkata N. Padmanabhan, "RADAR: An In-Building RF-Based User Location and Tracking System", Mar. 2000 (source: http://ieeexplore.ieee.org/xpl/articleDetails.jsp?arnumber=832252).

European Search Report issued in Application No. 10 164 483.9-2215, dated Nov. 12, 2010.

International Search Report and the Written Opinion issued in PCT/EP2011/058529, dated Oct. 20, 2011.

L. Tessens et al., "Efficient Approximate Foreground Detection for Low-Resource Devices," Distributed Smart Cameras, 2009.

Marleen Morbee et al., "Optimal Camera Selection in Vision Networks through Shape Approximation," 2008 IEEE 10th Workshop on Multimedia Signal Processing, pp. 46-51.

Christopher Wren et al., "Buzz: Measuring and Visualizing Conference Crowds," Mitsubishielectric Research Laboratories, TR2007-035, Mar. 2008, ACM Siggraph 2007 (Ermerging Technologies), Aug. 2007.

EP Office Action from Application No. 11 725 369.0, Feb. 19, 2015.

* cited by examiner

OPTICAL SYSTEM FOR OCCUPANCY SENSING, AND CORRESPONDING METHOD

FIELD OF THE INVENTION

The present invention generally relates to occupancy sensing, i.e. establishing a view on the occupancy of a space by persons and/or objects, like for instance a two dimensional (2D) top view or side view of a scene in a room containing people and objects, or a three dimensional (3D) map of a scene by combination of several 2D views. Occupancy sensing is used for various applications such as surveillance, video conferencing, smart rooms, building automation, sport games analysis, pick-and-place machine vision, intelligent airbags for cars, etc. The current invention in particular concerns a way for occupancy sensing that is very accurate, non-intrusive such that sensed objects or persons do not have to be tagged with dedicated devices, privacy friendly, low-power consuming in order to be battery operable, fast and cost-efficient, and has no or little impact on existing infrastructure and aesthetics.

BACKGROUND OF THE INVENTION

Occupancy sensing systems are used in a wide variety of applications. Typically, they provide input to other applications, such as a Building Automation System. As a result, it is desired that these occupancy sensing systems are relatively cheap, i.e. below the cost reductions that are achievable through applications that make use of the 2D or 3D occupancy knowledge, such as a smart building system that switches off lights for energy saving depending on the location and activity of people in the room.

One dimensional (1D) occupancy sensing systems are able to detect and observe the behaviour of a person or crowd, but not the fine details of their movements. Such one dimensional occupancy systems can generate numerical or statistical information but are not able to produce a 2D or 3D view on the occupancy of a space by people and objects. An example system that uses 1D occupancy sensors is described in the article "*Buzz: Measuring and Visualizing Conference Crowds*" from the authors Christopher Wren, Yuri Ivanov and Darren Leigh.

In order to be able to produce a 2D occupancy map, various 2D occupancy sensing systems have been proposed in literature: these existing 2D occupancy sensing systems are either based on cameras, passive infrared or PIR sensors, pressure sensitive carpets, or active beacons based on radar, ultrasound or radio technology. A combination of two or more of the foregoing techniques is also possible.

Camera based systems for 2D occupancy sensing, such as for instance the one described in U.S. Pat. No. 7,450,735 entitled "Tracking Across Multiple Cameras with Disjoint Views", rely on a single top-view camera or multiple cameras (side-view, top-view or a combination of both) in order to generate images that can be processed to establish an occupancy map of the room. These cameras are usually visible within the room and also the required wiring, e.g. for powering the cameras, has infrastructural and aesthetic implications. The cameras have a relatively high power consumption as a result of which it is difficult to operate them on battery power for the purpose of occupancy sensing. The cameras in other words need to be connected to power wiring or power over Ethernet wiring. Regular cameras produce detailed, high resolution images which further may pose these systems at risk of privacy breach when used for occupancy sensing. At last, the images generated by real-time still or video cameras require high bit rates and expensive image processing in order to turn the images into a 2D occupancy map. A single top-view camera reduces the costs and processing requirements in comparison with multiple cameras, but still suffers from excessive power consumption, the need for wiring, and the risk for privacy breaches. Moreover, a single top-view camera may loose accuracy when used in large rooms or rooms with a more complex geometry.

Existing solutions based on pressure sensors integrated in carpets, seats, flooring, etc. have as main disadvantage their intrusive nature in the interior of the room. Occupancy sensing systems based thereon require expensive alterations to existing infrastructure in case of renovation, or limit the choice of flooring materials significantly in case of new construction. In addition, these pressure sensor based occupancy sensing systems involve wiring for power and data because their power consumption does not allow battery-based operation.

State of the art occupancy sensing systems based on active sensors such as radar, ultrasound or radiofrequency (RF) based beacons typically need extensive noise cancellation and excessive processing because direction of arrival methods have to be applied. The position measurements obtained with these technologies are not as accurate as can be achieved with camera-based systems. Their power consumption is relatively high—they are active sensors—whereas their angular resolution is rather limited. The article "*Positioning with Independent Ultrasonic Beacons*" from the authors Michael McCarthy and Henk Muller for instance describes a system for positioning sensing based on ultrasound technology. A system based on RF technology is described in the article "*RADAR: An In-Building RF-Based User Location and Tracking System*" from the authors Paramvir Bahl and Venkata N. Padmanabhan.

PIR or passive infrared sensors generate binary output signals: motion or no motion. Their angular resolution is limited and as a result of the binary output, also the accuracy obtainable with PIR technology is limited. As a result, a large number of PIR sensors would be needed in order to obtain a reliable and accurate system for occupancy sensing. Occupancy systems based on PIR sensors are for instance described in U.S. Pat. No. 7,486,193 entitled "Occupancy Sensor Network".

It is an objective of the present invention to disclose a system and method for occupancy sensing that overcome the shortcomings of the above cited existing systems. In particular, it is an objective to disclose a system for occupancy sensing that is not intrusive and allows accurate sensing and cost-efficient generation of a 2D or 3D occupancy map with low energy consumption and without the risk for privacy breach when used in enterprises, elderly homes, etc.

SUMMARY OF THE INVENTION

According to the present invention, the above mentioned objectives are realized by an optical system for occupancy sensing, the system comprising:
  a plurality of optical line sensors, each optical line sensor comprising a linear array of light sensing elements; and
  an optical light integrating device adapted to integrate light from rays with incidence angles subject to geometric constraints to be sensed by a light sensing element out of the light sensing elements.

Thus, the current invention makes use of multiple optical line sensors that are equipped with a light-integrating device that integrates all light rays with incidence angles subject to certain geometric constraints. The invention is based on the insight that for some applications it is beneficial to aggregate observations because of e.g. repetitive structures in the scene. According to the invention, it is proposed to perform the aggregation optically, as will be further explained below. In particular for applications such as 2D occupancy sensing, pick-and-place machine vision, intelligent airbags, etc., observations along one direction can be reduced to a single observation. For these applications, the light-integrating device can be designed such that it integrates all light along that direction which reduces the required number of sensing elements. As opposed to cameras that have a two-dimensional array of sensing elements, an optical line sensor is a linear array of light sensing elements such as photodiodes, thus simplifying the observation and the post-processing. Such optical line sensors are commercially available and used for instance in scanners that scan two dimensional images by moving the optical line sensor with respect to the image, or vice versa, by moving the image or object that is scanned. Such optical line sensors are particularly useful in the occupancy sensing system according to the current invention because of their low power consumption, currently near 8 mWatt or about a factor 100 below the power consumption of available camera sensors, their high achievable data rates, their high bit depth, their privacy-friendly nature, and their low cost of about 4 Euros today. Since the line sensors can be battery-operated, there is no need for changes in infrastructure or wiring.

The light integrating device integrates all light with incidence angles subject to specific geometric constraints onto a single photodiode or more generally onto a single light sensing element in a line sensor. Each element or pixel in a line sensor consequently senses only the light coming from a certain incidence region in the three dimensional space. The combination of an optical line sensor and a light integrating device is called a light integrating line sensor throughout this patent application. The data produced by such a light integrating line sensor is called a scan line throughout this patent application. In the invented occupancy sensing system, multiple line sensors view a scene in the space from different directions, each producing a scan line. The scan lines from multiple line sensors, i.e. two or more, are used for 2D or 3D occupancy calculation.

An important advantage of the light-integrating optical line sensors based occupancy sensing is that the acquisition of a scan line, which is the first step of known occupancy sensing algorithms from literature, such as for instance the one described in the article "*Optimal Camera Selection in Vision Networks through Shape Approximation*", authored by M. Morbee, L. Tessens, H. Lee, W. Philips and H. Aghajan, and published in the *Proceedings of the* 2008 *IEEE* 10*th Workshop on Multimedia Signal Processing*, pages 46-51, is performed completely optically without any need for processing or memory resources. Also the energy requirements are minimized in this first step as the line sensors have low power consumption and can be battery-operated.

Optionally, the region in space containing the rays with incidence angles subject to geometric constraints may be frustum shaped, and the optical light integrating device may comprise a light passing aperture.

Indeed, when the light integrating device is implemented as an aperture in a plate, the light rays from a frustum shaped region in 3D space shall be integrated onto a single light sensing element.

According to a further optional aspect of the optical system for occupancy sensing according to the current invention, the region in space containing the rays with incidence angles subject to geometric constraints may be centred along a two dimensional plane, the plane comprising the light sensing element and being oriented along a predefined viewing direction and a direction of integration.

Thus, information from a frustum centred around a plane along the viewing direction and the direction of integration is observed by one light sensing element. The direction of integration coincides with the direction along which observations are combined. The direction of the line sensor itself must coincide with the direction along which data will be gathered. In case the line sensor is mounted horizontally, each light sensing element shall for instance sense the light coming from a plane that contains the light sensing element and that is oriented along a predefined viewing direction and the direction of integration. For 2D occupancy sensing in a room, this is advantageous because one is not interested in occupancy information along an axis perpendicular to the ground plane but in a 2D top view occupancy map. The information along an axis perpendicular to the ground plane is to be combined into a single observation for each 2D top view position.

Further, the optical light integrating device in the optical system according to the present invention, may comprise a light passing slit substantially perpendicular to the optical line sensor.

Thus, a simple and cost-effective implementation of the light integrating device consists of a slit in a plate, e.g. made out of metal, plastic, or an alternate material. The slit is positioned perpendicular to the line sensor, e.g. vertically in case the line sensor is mounted horizontally on a wall in the room. According to this implementation, each light sensing element shall sense the light coming from a plane that contains the light sensing element and the slit. As an alternative for a slit, the light integrating device could consist of a lens or set of lenses. An implementation with lenses however is more expensive. One can argue that lenses with large aperture can increase the light intensity on the photodiodes in comparison with a slit implementation, but this is generally not needed and even not desirable since light-sensing elements of line sensors are usually very light-sensitive due to their relatively large sensing surface compared to e.g. light-sensing elements of cameras.

Further optionally, the optical system is adapted for occupancy sensing in a substantially rectangular room and the plurality of optical line sensors consists of two optical line sensors respectively mounted in different corners of the room adjacent to a long wall of the room.

Thus, a preferred implementation of the current invention contains two line sensors mounted horizontally in two corners that are adjacent to one of the longest walls of a rectangular room. This way, the maximum positioning error on the position of a single person or object present in the room is minimized, as will be explained further in this patent application. In case of applications like machine vision or occupancy sensing in e.g. automotive, the term room must be broadly interpreted to cover a (substantially rectangular) space, and the term wall must be interpreted to cover any delineation of such space.

Alternatively, the optical system is adapted for occupancy sensing in a substantially rectangular room and the plurality of optical line sensors consists of three optical line sensors respectively mounted in different corners of the room.

Again, three line sensors located horizontally in three different corners of a rectangular room shall minimize the maximum positioning error on a single person or object present in the room, as will be explained further.

According to another alternative implementation of the invention, the optical system is adapted for occupancy sensing in a substantially rectangular room and the plurality of optical line sensors consists of four optical line sensors respectively mounted in two opposite corners of said room, and along opposite long walls of the room adjacent to the two opposite corners.

Also in this situation, the maximum positioning error on a single person or object in the room is minimized.

Still optionally, each optical line sensor out of the plurality of optical line sensors may be mounted on a wall within the room such that the persons and/or objects of interest are sensed, typically at a height between 0 cm and a minimum height of a typical person/object to be detected.

In other words, in a preferred embodiment of the invention, the line sensors are positioned at a height where any person that is present in the room, sitting or standing, and any object of interest will be detected. The line sensors therefore preferably are positioned parallel to the ground plane, at a height that lies between the ground plane and the height of an average object to be detected.

According to a further optional aspect, the optical system may comprise:
one or more processor(s) adapted to receive data from at least one of the plurality of optical line sensors or another processor, and adapted to process the data according to a background/foreground processing algorithm in order to determine occupancy.

Indeed, on the scan lines from the line sensors, a processor can apply known background/foreground subtraction algorithms. Such subtraction algorithms are for instance described in the article "*Efficient Approximate Foreground Detection for Low-Resource Devices*" from the authors L. Tessens, M. Morbee, W. Philips, R. Kleihorst and H. Aghajan. A single processor may process the scan lines from plural line sensors. Alternatively, a processor per line sensor may be foreseen, eventually complemented with a central processor. As a result of such algorithm, the processor(s) shall determine the probability that a pixel in a scan line is a foreground pixel. The background/foreground information received from the algorithm can be submitted to a threshold in order to obtain a binary signal. Thereafter, a 2D or 3D occupancy map can be calculated using known algorithms. Alternatively, the background/foreground information can be kept without submission to a threshold, and a more accurate 2D or 3D occupancy map can be calculated using a different known algorithm.

According to a further optional aspect of the optical system for occupancy sensing according to the current invention, the processor is adapted to determine a two dimensional occupancy map from data received from N optical line sensors, using the probability function:

$$p(\mu_x | O_1, \ldots, O_N) = \frac{p(\mu_x)}{p(O_1, \ldots, O_N)} \prod_{i=1}^{N} \frac{p(\mu_x | O_i) p(O_i)}{p(\mu_x)}$$

with:
x representing a discrete base cell on a ground plane;
$\mu_x$ representing an occupancy parameter that has a first value $occ_x$ when cell x is occupied and a second value $nocc_x$ when cell x is not occupied;
$O_i$ representing an observation by optical line sensor i, with i being an integer value ranging from 1 to N;
$p(O_1, \ldots, O_N)$ representing a probability of observations $O_1, \ldots, O_N$ by the N optical line sensors;
$p(\mu_x)$ representing a probability for occupancy/non-occupancy of cell x;
$p(O_i)$ representing a probability for observation $O_i$ by optical line sensor i; and
$p(\mu_x | O_i)$ representing a probability mass function of the occupancy parameter $\mu_x$ given an observation $O_i$ by optical line sensor i.

The probabilistic way to calculate a 2D occupancy map from data received from multiple light integrating line sensors is preferred over existing binary methods because of increased accurateness.

Further optionally, the processor may be adapted to determine $p(\mu_x | O_i)$ by:

$$p(\mu_x = occ_x | O_i) = g_{ix} f_{ix} \text{ and } p(\mu_x = nocc_x | O_i) = 1 - g_{ix} f_{ix}$$

with:
$f_{ix}$ representing a fraction of foreground pixels; and
$g_{ix}$ being determined by:

$$g_{ix} = \frac{W^2}{(1 + W - 1)(b + W - 1)}$$

with:
W representing the average number of cells a person or object is occupying in each direction;
l representing the length in number of cells of an approximately rectangular region on the ground plane that is projected on a light sensing element; and
b representing the width in number of cells of the approximately rectangular region on the ground plane that is projected on a light sensing element.

Indeed, as will be explained in more detail below, under reasonable assumptions, the probability mass function of the occupancy parameter $p(\mu_x | O_i)$ can be calculated by fusing the fractions of foreground/background pixels sensed by multiple light integrating line sensors.

Further optionally, the processor may be adapted to receive and process data from plural shots in time taken by at least one of the optical line sensors or from plural shots in time of an occupancy map.

Thus, the line sensors may be controlled to produce plural scan lines at successive time moments. These scan lines, in particular the changes between successive scan lines, may be used by the processor(s) to more accurately determine the background/foreground pixels. Similarly, successive 2D/3D occupancy maps may be used by the processor(s) to more accurately determine 2D/3D occupancy.

In addition to an optical device for occupancy sensing, the current invention also relates to a corresponding method for occupancy sensing in a room, the method comprising the steps of:
providing in the room a plurality of optical line sensors, each optical line sensor comprising a linear array of light sensing elements; and
integrating light from rays with incidence angles subject to geometric constraints to be sensed by a light sensing element out of the light sensing elements.

DETAILED DESCRIPTION OF EMBODIMENT(S)

Figure 1A:
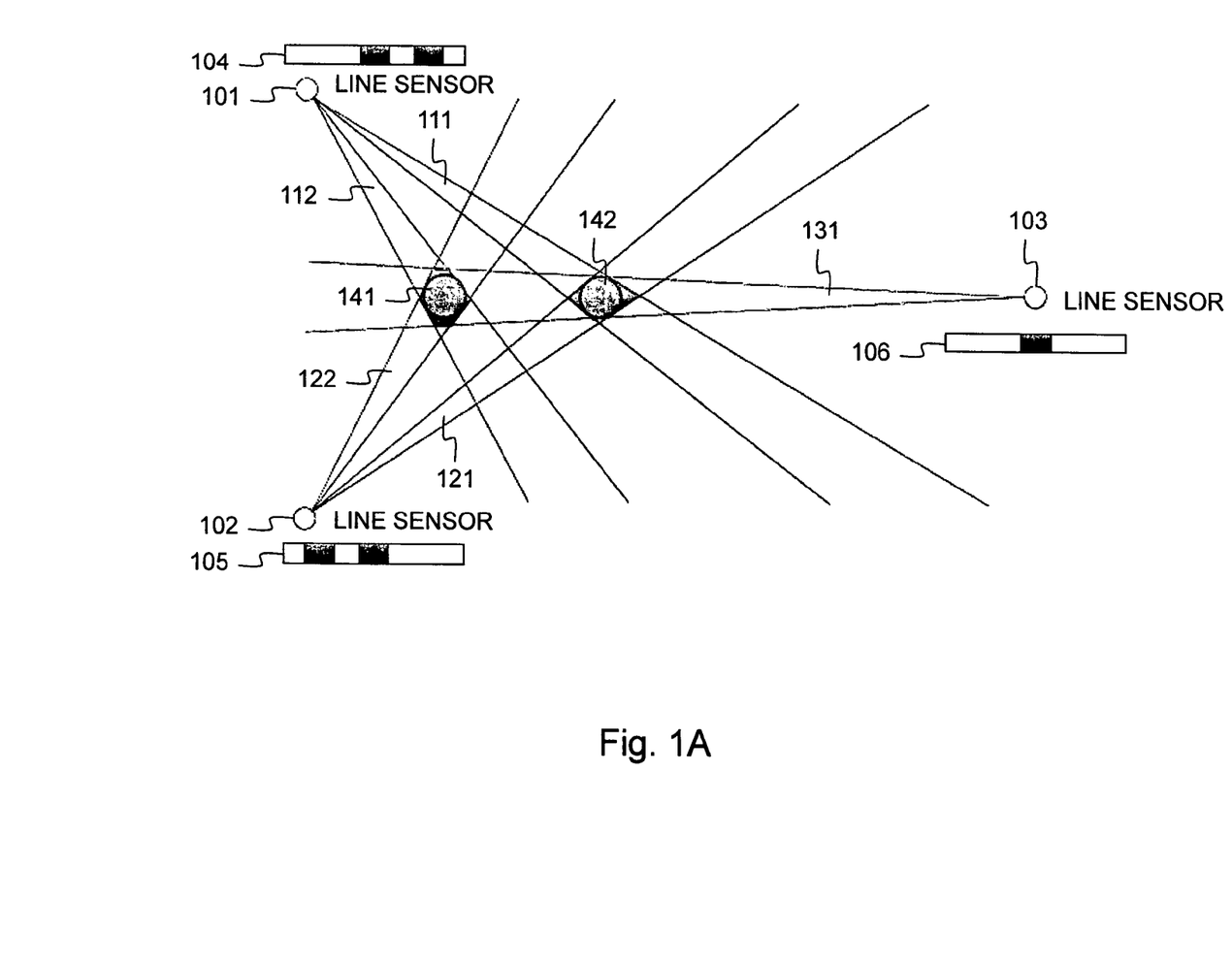
FIG. 1A illustrates an embodiment of the occupancy sensing system according to the present invention.
Figure 4:
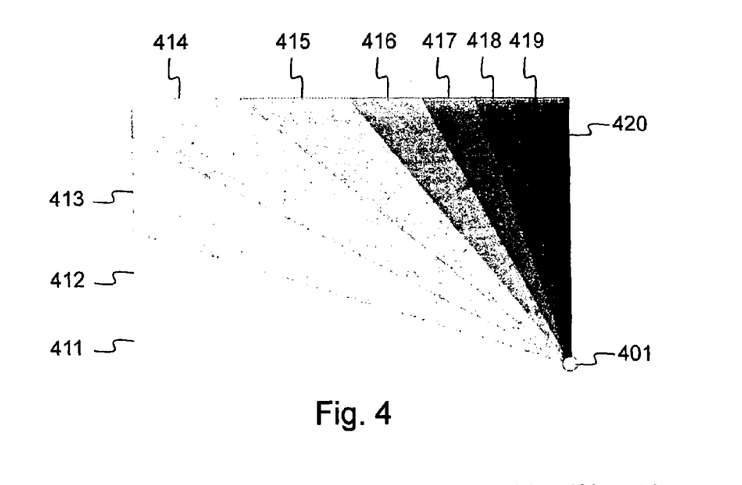
FIG. 4 illustrates the re-projection frustums of an optical line sensor used in an embodiment of the occupancy sensing system according to the present invention.

FIG. 1A shows an embodiment of the occupancy sensing system according to the invention that consists of three light integrating optical line sensors 101, 102 and 103. These light integrating optical line sensors 101, 102 and 103 are linear arrays of photodiodes that are positioned parallel to the ground plane at a height such that the persons or objects of interest are sensed, e.g. for persons at 150 cm from the ground plane. The light integrating line sensors 101, 102 and 103 include optical light integrating devices that consist of metal plates with a slit. This slit controls the re-projection frustum of each photodiode, i.e. the light that is integrated onto that photodiode. These re-projection frustums are centred along vertical planes. The re-projection frustum of a photodiode is centred along a vertical plane that contains the photodiode and the slit, which is the light integrating device. In FIG. 4, some of these re-projection frustums are shown in a 2D representation and referenced by 411, 412, 413, 414, 415, 416, 417, 418, 419 and 420. The line sensor 401 is supposed to contain ten photodiodes. In a practical line sensor, the number of photodiodes is much higher, but for the sake of clarity ten photodiodes were chosen for FIG. 4. The frustums are represented in two dimensions (2D) but have a three-dimensional (3D) shape, which is the extension along the direction of the slit of the 2D projection of the frustum—this 2D projection is shown in FIG. 4—along the direction of the slit. By extension, the re-projection frustum of a set of (adjacent) photodiodes is defined as the union of the re-projection frustums of each of the individual photodiodes.

Figure 1B:
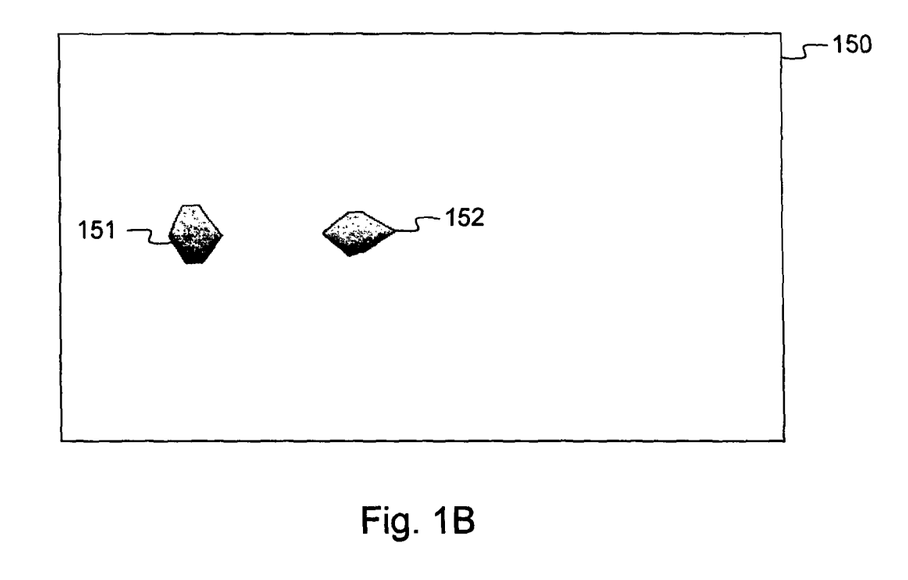
FIG. 1B illustrates a 2D occupancy map measured by the embodiment of the occupancy sensing system of FIG. 1A.

FIG. 1A further shows two persons, 141 and 142, that are present in the room. As is illustrated by FIG. 1A, these two persons, 141 and 142, are detected by two sets of spatially grouped photodiodes in the first line sensor 101, more particularly by the set of photodiodes with re-projection frustum 111 and the set of photodiodes with re-projection frustum 112. The two persons, 141 and 142, are also detected by two sets of photodiodes in the second line sensor 102, more particularly by the set of photodiodes with re-projection frustum 121 and the set of photodiodes with re-projection frustum 122. In the third line sensor 103, only the set of photodiodes with re-projection frustum 131 senses the presence of the persons 141 and 142. The scan lines from line sensors 101, 102 and 103 are transferred to a central processor (or respective individual processors, or a combination) that applies a state of the art background/foreground subtraction algorithm to locate the two people 141 and 142. As a result, the light integrating line sensors 101, 102 and 103 generate the scan line with foreground/background images 104, 105 and 106, shown in FIG. 1A. The black pixels in these scan line foreground/background images 104, 105 and 106 denote the presence of a person or object, whereas the white pixels in these scan line foreground/background images 104, 105 and 106 denote the absence thereof. These scan line foreground/background images 104, 105 and 106 are used to generate a 2D occupancy map 150 of the room showing the respective top view positions 151 and 152 of the persons 141 and 142 in the room. This occupancy map 150 is drawn in FIG. 1B.

Figure 2:
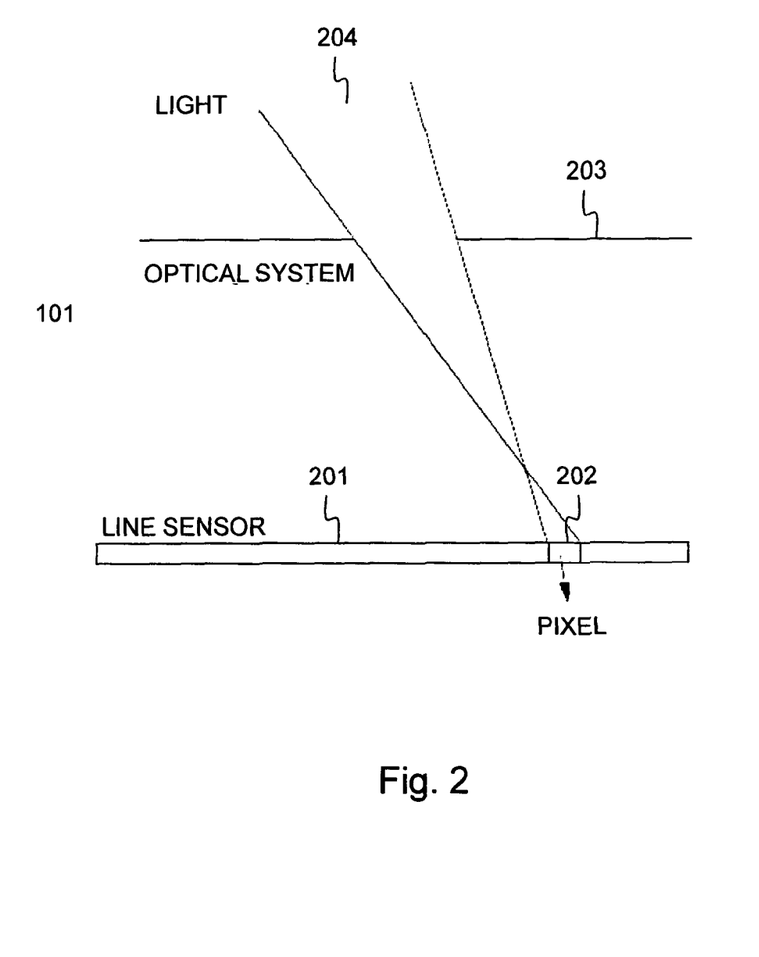
FIG. 2 illustrates an optical line sensor as used in an embodiment of the occupancy sensing system according to the present invention.

FIG. 2 shows the light integrating line sensor 101 of FIG. 1 in more detail. The light integrating line sensor 101 contains a line sensor 201 or linear array of photodiodes 202 each of which represents a pixel in the scan line that will be produced by the line sensor 201. The light integrating line sensor 101 further contains a light integrating device 203 which is implemented as a slit in a metal plate. As a result of the slit, all light within the re-projection frustum 204 is integrated onto the photodiode 202. As a consequence, all light within the frustum centred along a vertical plane that contains the slit and photodiode 202 is sensed by the photodiode 202.

Figure 3A:
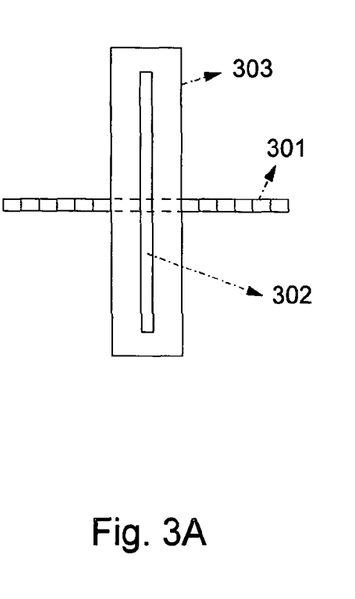
FIG. 3A and FIG. 3B illustrate a light integrating optical line sensor as used in an embodiment of the occupancy sensing system according to the present invention.
Figure 3B:
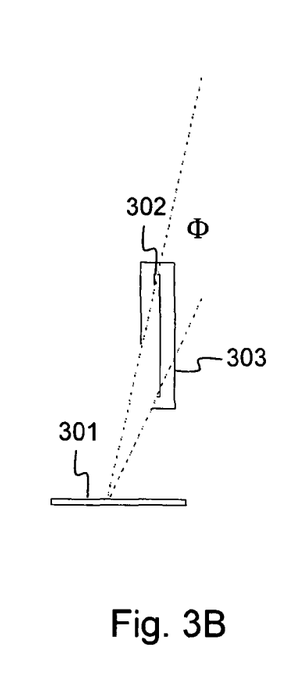

FIG. 3A and FIG. 3B further illustrate the positioning of a slit 302 in metal plate 303 vis-à-vis the line sensor 301. Typically, the slit 302 will be positioned perpendicular or substantially perpendicular to the direction of the line sensor 301, such that the re-projection frustum of a photodiode in the line sensor 301 becomes centred along a vertical plane φ perpendicular to the line sensor 301 and containing the respective photodiode. Thus, each photodiode or sensing element of the line sensor 301 senses the light coming from a frustum centred around a two-dimensional plane that comprises the light sensing element and the slit and which is oriented along the viewing direction. Such an optical system based on a light-passing aperture or slit is more attractive than a lens because it is easier and cheaper to produce and mount, and it still allows sufficient light to fall onto the sensor in order to produce useful output data. In this respect, it is worth noting that the sensing elements of a line sensor are more light sensitive than for instance those of a regular camera.

As illustrated here above, intersecting the areas sensed by several photodiodes in plural line sensors enables to localize the foreground objects on a 2D or 3D occupancy map. The number of line sensors, the position of these line sensors, the viewing direction of these line sensors, and the viewing range of these line sensors are parameters that should be determined in order to minimize an error criterion that is suitable for the application wherein the occupancy sensing is used. Two examples of such error criteria are the average positioning error and the maximum positioning error of a person or object in a room.

In case the average positioning error of a person or object in the room is to be minimized, the above listed design parameters of the occupancy sensing system according to the invention should be determined such that the average size of the area intersecting the re-projection frustums of photodiodes of different line sensors is minimized. Alternatively, the different intersection areas can be weighted with weights taking into account the statistics of the room occupancy in order to minimize a weighted average positioning error. This way, areas that are more likely to be occupied with persons or objects are given a higher weight.

In case the maximum positioning error of a person or object in the room is to be minimized, the above listed design parameters of the occupancy system according to the invention should be determined such that the maximum size of the area intersecting the re-projection frustums of photodiodes of different line sensors is minimized. Also in this case, the positioning errors of the different intersections can be scaled with weighing factors such that areas that are more likely to be occupied become privileged in the error criterion.

FIG. 4 illustrates a light integrating line sensor with a viewing range of 90° and ten light sensing elements in a rectangular room whose length equals twice the width. It is assumed that the viewing direction of a line sensor is centred along an angle of 45° to the two walls in case the line sensor is positioned in a corner of the room, and assumed that the viewing direction of the line sensor is perpendicular to the wall whenever the line sensor is positioned on a wall. Under these assumptions, the positioning of a single light integrating line sensor 401 that minimizes the maximum positioning error for a person or object in the room without considering a weight factor, is in one of the four corners as illustrated by FIG. 4. FIG. 4 further shows the re-projection frustums 411, 412, 413, 414, 415, 416, 417, 418, 419 and 420 of ten photodiodes or light sensing elements that form part of the light integrating line sensor 401. The different re-projection frustums are represented by different grey levels, going from white for re-projection frustum 411 to black for re-projection frustum 420.

Figure 5A:
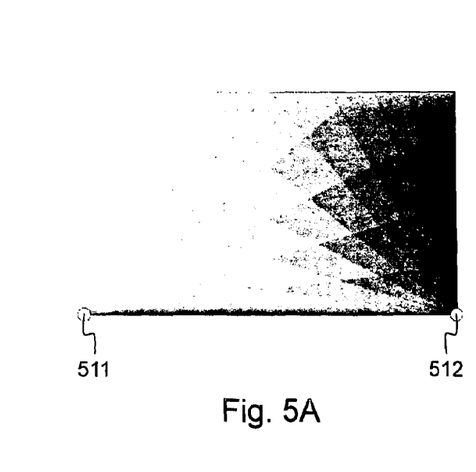
FIG. 5a illustrates the intersections of re-projection frustums of two optical line sensors used in an embodiment of the occupancy sensing system according to the present invention.
Figure 5B:
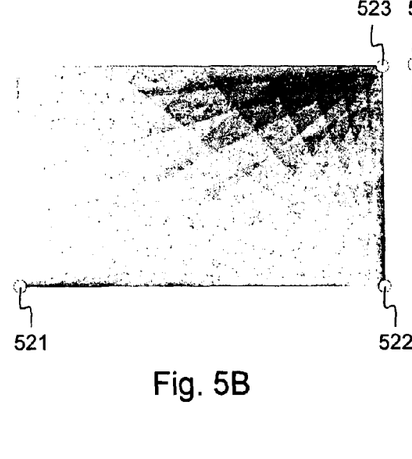
FIG. 5b illustrates the intersections of re-projection frustums of three optical line sensors used in an embodiment of the occupancy sensing system according to the present invention.
Figure 5C:
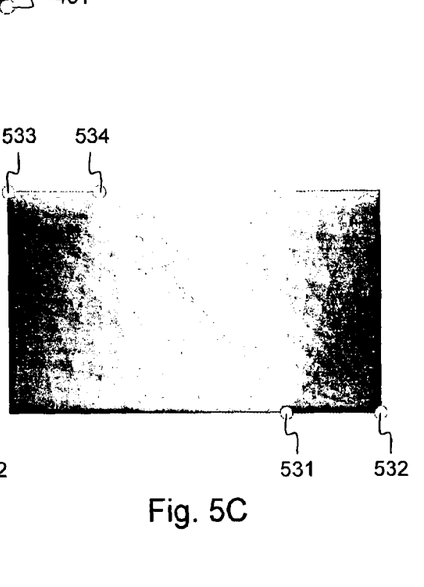
FIG. 5c illustrates the intersections of re-projection frustums of four optical line sensors used in an embodiment of the occupancy sensing system according to the present invention.

In case of an occupancy sensing system with two light integrating line sensors 511 and 512, and under similar assumptions, the positioning of these light integrating line sensors 511 and 512 that minimizes the maximum positioning error of a person or object in the room is in the corners adjacent to one of the long walls of the rectangular room. One possibility is illustrated by FIG. 5A. Similarly, for a system with three light integrating line sensors, 521, 522 and 523, with minimized maximum positioning error, the three line sensors 521, 522 and 523 have to be located in three corners of the room. One of the four possible configurations is illustrated by FIG. 5B. For an occupancy sensing system with four light integrating line sensors, 531, 532, 533 and 534, that still satisfy the above assumptions, two light integrating line sensors, e.g. 532 and 533, have to be positioned in opposite corners of the room whereas the remaining two light integrating line sensors, e.g. 531 and 534, have to be positioned along the long wall and adjacent to the corners wherein the first two light integrating line sensors are located. FIG. 5C shows one possible configuration in case of four line sensors.

FIG. 6, FIG. 7A, FIG. 7B, and FIG. 7C illustrate optimized positioning of the light integrating line sensors in embodiments of the current invention that are used for occupancy sensing in an elliptical room whose major axis equals twice the minor axis.

Figure 6:
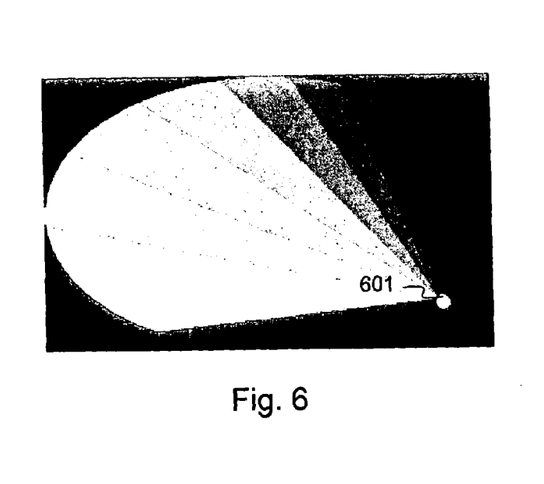
FIG. 6 illustrates the re-projection frustums of an optical line sensor used in an embodiment of the occupancy sensing system according to the present invention for an elliptical room.

FIG. 6 shows a single light integrating line sensor 601 with a viewing range of 90 degrees. This light integrating line sensor 601 has to be positioned as indicated in FIG. 6 in order to minimize the maximum positioning error for one person or object in the room, again assuming that no weights are used to scale the different areas in the room in function of their statistical chance for being occupied.

Figure 7A:
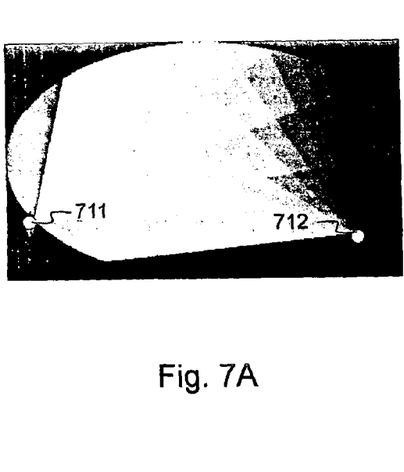
FIG. 7a illustrates the intersections of re-projection frustums of two optical line sensors used in an embodiment of the occupancy sensing system according to the present invention for an elliptical room.
Figure 7B:
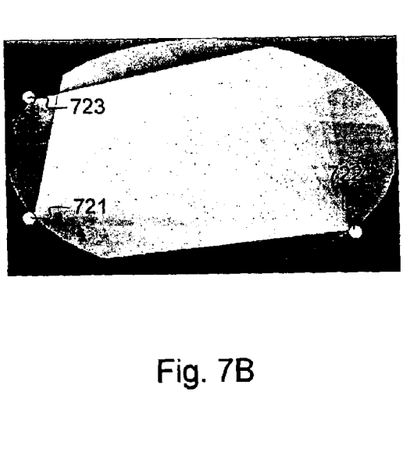
FIG. 7b illustrates the intersections of re-projection frustums of three optical line sensors used in an embodiment of the occupancy sensing system according to the present invention for an elliptical room.
Figure 7C:
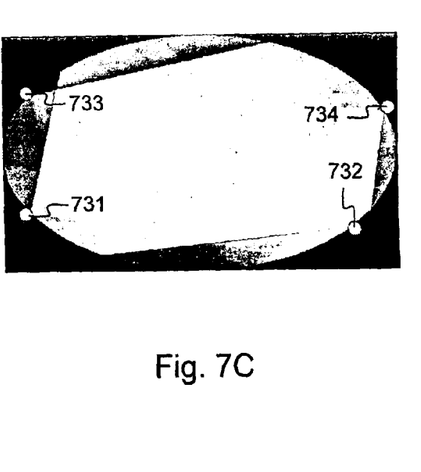
FIG. 7c illustrates the intersections of re-projection frustums of four optical line sensors used in an embodiment of the occupancy sensing system according to the present invention for an elliptical room.

In case of an occupancy system according to the invention containing two light integrating line sensors, 711 and 712, the optimal positioning and viewing direction in order to minimize the maximum positioning error is illustrated by FIG. 7A. For a similar embodiment of the invented occupancy sensing system, having three light integrating line sensors 721, 722 and 723, the positioning and viewing direction that minimizes the maximum positioning error on the occupancy of a single person or object in the room, is illustrated by FIG. 7B. At last, FIG. 7C illustrates the positioning and viewing direction of four light integrating line sensors, 731, 732, 733 and 734 that minimize the maximum positioning error for one person or object in an elliptical room.

It is noticed that in case more than one person or object occupies the room, the above illustrated optimal positioning and viewing directions of the light integrating line sensors still holds when it is assumed that no person or object blocks the sensors' view on another person or object. In case of occlusion, a larger number of light integrating line sensors is beneficial to reduce the percentage of sensors whose viewing range is blocked.

Although the invention has been described here above with reference to detection of the location of persons or objects in a room, the applicability of occupancy sensing based on light integrating line sensors goes beyond person and object location in a room and 2D mapping thereof. In particular for vision applications where observations along one direction can be reduced to a single observation, e.g. because what one measures has a repetitive structure along this direction, the current invention is useful. For 2D occupancy sensing in a room, it is for instance not important if the measurement is done at knee-height or shoulder height when people are supposed to stand upright. Thanks to the optical light integrating element, the current invention combines observations along one direction.

Figure 8:
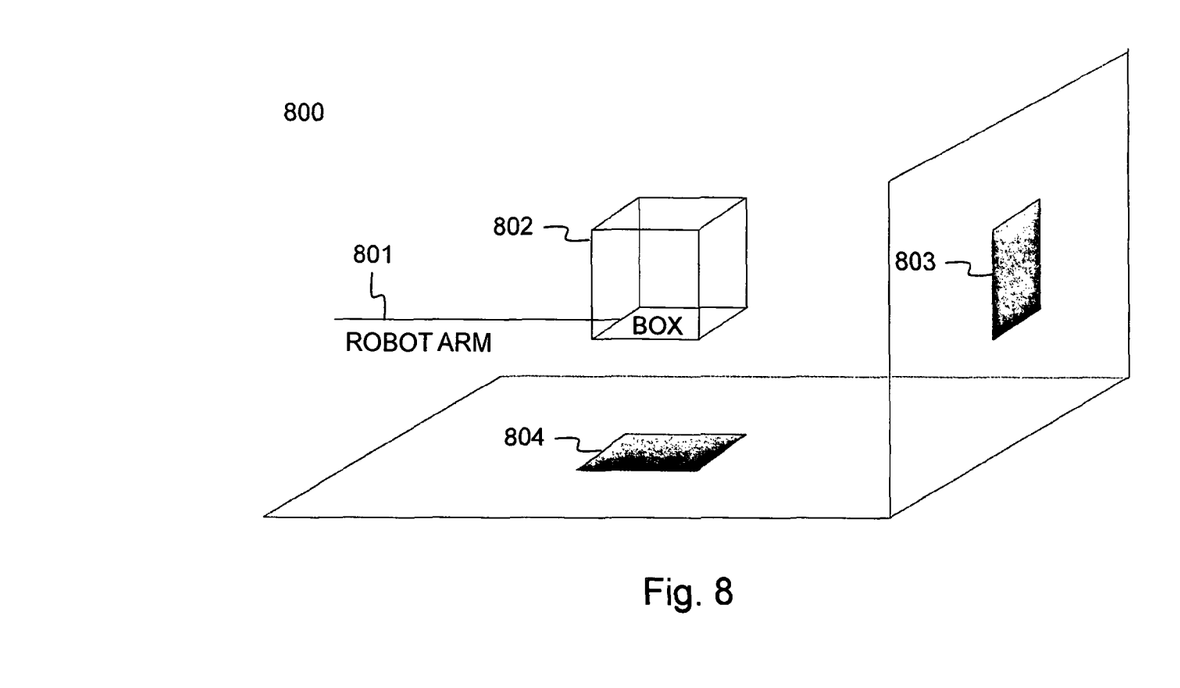
FIG. 8 illustrates a 3D occupancy map generated by an embodiment of the occupancy sensing system according to the invention in a pick-and-place application.

A different area wherein the invention can be used for instance is pick-and-place machine vision. In applications where robot arms have to position boxes, it is important to know where the boxes are located in order to control the robot arms, avoid collisions, etc. Such an application of the current invention is illustrated by FIG. 8. The location of a robot arm 801 and a box 802 can be sensed and visualized on a 3D map 800 that is constituted for instance from two 2D occupancy maps, 803 and 804, that are generated using an embodiment of the invention as described here above. Plural side view maps and/or top view maps generated according to the current invention may then be combined in order to produce a 3D map 800 of the boxes and robot arms.

In yet another application, the current invention may assist an intelligent airbag to detect the kind of object that is located in a vehicle's seat, e.g. a person, a bag, a kid's chair, etc. The current invention may further assist the intelligent airbag in determining the exact position of the object, e.g. left or right, in the front or back of the seat. An embodiment of the current invention may therefore be adapted to determine occupancy of a vehicle's seat relative to vertical and horizontal axes of the seat. The occupancy information produced according to the current invention will then serve as input to control the intelligent airbag in case of an accident.

In the following paragraphs, a preferred method for determining a 2D occupancy map will be outlined. Such 2D occupancy map is a two-dimensional map that provides a top view of a scene containing people or objects. Such maps are important in many applications such as surveillance, smart rooms, video conferencing, sport games analysis, etc. The method relies on fusing the foreground/background scan lines from multiple light integrating optical line sensors in a system according to the present invention, thereby using a Bayesian approach. This preferred probabilistic method for calculating a 2D occupancy map is very accurate, very low-power, ultra cheap, privacy-friendly and non-intrusive, i.e. sensed objects do not have to be equipped with dedicated gear. The calculation method however is not restricted to input data coming from an optical system according to the current invention, i.e. with multiple light integrating line sensors, but may be applied to generate 2D occupancy maps starting from multiple camera images or other sensory input with similar advantages over existing 2D occupancy map calculation methods.

The article "Optical Camera Selection in Vision Networks through Shape Approximation" from the authors Marleen Morbee, Linda Tessens, Huang Lee, Wilfried Philips and Hamid Aghajan, published on pages 46-51 of the Proceedings of the 2008 IEEE 10th Workshop on Multimedia Signal Processing, October 2008, for instance discloses a calculation method for a 2D occupancy map, starting from binary scan lines. Basically, the proposed approach relies on AND operation, could be applied to data received from multiple light integrating optical line sensors, but is not very accurate and reliable.

A more advantageous method for calculating a 2D occupancy map starting from scan lines from multiple light integrating line sensors follows a probabilistic, Bayesian approach, as will be explained below.

Thereto, a network of N light-integrating line sensors is considered, and the ground plane of the observed scene is discretised in cells x. The processor implementing the method shall assign a real value to each cell x, the real value expressing the probabilistic confidence that the cell x is occupied by a person or object.

Thus, the method assesses in a Bayesian formulation the probability that a cell x on the ground plane is occupied based on the observations of all N light integrating line sensors. To this end, the variable $\mu_x$ is introduced. This variable $\mu_x$ can take two values:

$\mu_x = occ_x$ meaning that the cell x is occupied; and
$\mu_x = nocc_x$ meaning that the cell x is not occupied.

The observation of the light integrating line sensor i, with i=1 ... N, is denoted by $O_i$, and the probability mass function of $\mu_x$ given the observations $O_1 \ldots O_N$ of all N line sensors is denoted by $p(\mu_x|O_1, \ldots, O_N)$. Applying Bayes' rule, this probability mass function $p(\mu_x|O_1, \ldots, O_N)$ is given by:

$$p(\mu_x | O_1, \ldots, O_N) = \frac{p(O_1, \ldots, O_N | \mu_x) p(\mu_x)}{p(O_i, \ldots, O_N)} \quad (1)$$

Herein, $p(O_1, \ldots, O_N|\mu_x)$ represents the probability of observations $O_1, \ldots, O_N$ given the occupancy/non-occupancy state $\mu_x$;

$p(\mu_x)$ represents the probability of occupancy/non-occupancy; and $p(O_1, \ldots, O_N)$ represents the probability of observations $O_1, \ldots, O_N$.

If it is assumed that the observations of the different light integrating line sensors are conditionally independent from each other, the observation process of each light integrating line sensor for a given state of the variable $\mu_x$ is assumed to be an independent process. This is a reasonable assumption when the influences of general conditions on all light integrating line sensor observations simultaneously, e.g. scene lighting changes are ignored. The probability $p(O_1, \ldots O_N|\mu_x)$ is then given by:

$$p(O_1, \ldots, O_N | \mu_x) = \Pi_{i=1}^{N} p(O_i | \mu_x) \quad (2)$$

Herein, $p(O_i|\mu_x)$ represents the probability for observation $O_i$ by light integrating line sensor i given the occupancy/non-occupancy state $\mu_x$.

Substituting equation (2) in equation (1) results in:

$$p(\mu_x | O_1, \ldots, O_N) = \frac{p(\mu_x)}{p(O_1, \ldots, O_N)} \prod_{i=1}^{N} p(O_i | \mu_x) \quad (3)$$

Herein, $p(\mu_x)$ can be specified based on prior information.

The prior probability of occupancy or non-occupancy can for example be defined as:

$$p(\mu_x = occ_x) = p(\mu_x = nocc_x) = 0.5$$

Alternatively, a situation with more informative prior knowledge can be considered. For example, if assumed that a room whose ground plane has a total of $C_{tot}$ of cells, is occupied by on average M persons, each person occupying approximately $W^2$ cells, then:

$$p(\mu_x = occ_x) = \frac{MW^2}{C_{tot}} \quad (4)$$

and:

$$p(\mu_x = nocc_x) = 1 - \frac{MW^2}{C_{tot}} \quad (5)$$

It is noticed that in an even more advanced setup, room occupancy statistics could be gathered and priors for each cell x could be adapted to these occupancy statistics.

The probabilities $p(O_i|\mu_x)$ relating the light integrating line sensor observations $O_i$ given the state of the occupancy parameter $\mu_x$ can be modeled based on the physical properties of the light integrating line sensors. To establish such a model, Bayes' rule is applied as follows:

$$p(O_i | \mu_x) = \frac{p(\mu_x | O_i) p(O_i)}{p(\mu_x)} \quad (6)$$

Figure 9:
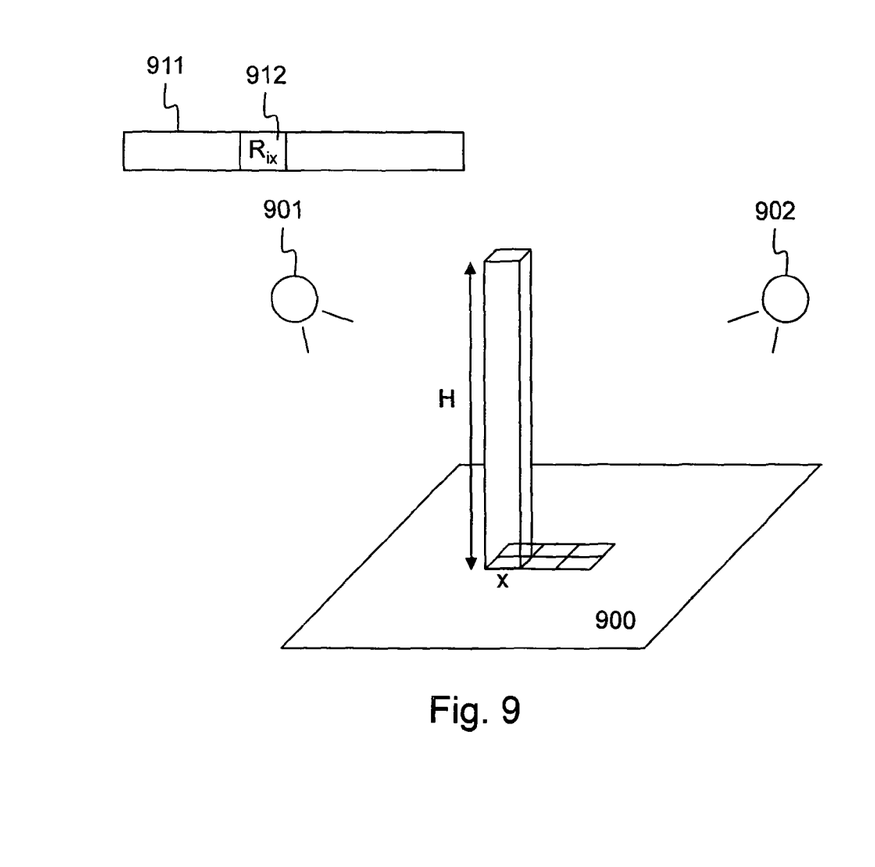
FIG. 9 illustrates the projection of a rectangular cuboid on a region $R_{ix}$ of a light integrating light sensor in an embodiment of the current invention with probabilistic Bayesian based 2D occupancy map generation.

To model the probability mass function $p(\mu_x|O_i)$ of the occupancy parameter $\mu_x$ given the observation $O_i$ of light integrating line sensor i, a rectangular cuboid with height H and cell x as base is considered. This cuboid is shown in FIG. 9 which further depicts the ground plane 900 of the room and two light integrating line sensors, 901 and 902. H is the height along which the light integrating device can integrate light. If this 3 dimensional box lies completely outside the viewing frustum of line sensor i, this line sensor i cannot provide any information about the occupancy of x. The probability of occupancy or non-occupancy is then equal to the prior probability $p(\mu_x)$, i.e.:

$$p(\mu_x = occ_x | O_i) = p(\mu_x = nocc_x | O_i) = 0.5$$

Or alternatively, again a situation with more informative prior knowledge can be considered. For example, if assumed that the room whose ground plane 900 has a total number $C_{tot}$ of cells is occupied by on average M persons, each person occupying approximately a square of $W^2$ cells, then:

$$p(\mu_x = occ_x | O_i) = \frac{MW^2}{C_{tot}} \qquad (7)$$

and:

$$p(\mu_x = nocc_x | O_i) = 1 - \frac{MW^2}{C_{tot}} \qquad (8)$$

It is noticed that in an even more advanced setup, room occupancy statistics could be gathered and the priors for each cell x could be adapted to these occupancy statistics.

On the other hand, if this 3 dimensional box lies inside the viewing frustum of light integrating line sensor i, this cuboid corresponds to one or more light sensing elements of light integrating line sensor i and these light sensing elements define a line sensor region $R_{ix}$ or 912 in FIG. 9 for scan line 911. Thus, the projection of a rectangular cuboid with height H and cell x as base into light integrating line sensor 901 defines a region 912 or $R_{1x}$ on the output line 911 of the first line sensor 901. The scan line from each light integrating line sensor is segmented into background pixels and foreground pixels generated by a background/foreground processing algorithm such as the one described in the article "*Efficient Approximate Foreground Detection for Low-Resource Devices*" from the authors L. Tessens, M. Morbee, W. Philips, R. Kleihorst and H. Aghajan, published in *Distributed Smart Cameras*, 2009. Then in each region $R_{ix}$ the fraction of background pixels $b_{ix}$ and the fraction of foreground pixels $f_{ix}$ can be determined. Obviously, $b_{ix}+f_{ix}=1$. It is noticed that in most cases, the resolution of the ground plane discretisation will be chosen such that the rectangular cuboid with as base cell x is projected onto a region in the line sensor not wider than one light sensing element of the line sensor. In this scenario, $f_{ix}=0$ and $b_{ix}=1$ when the line sensing element corresponding to cell x is part of the background, or $f_{ix}=1$ and $b_{ix}=0$ when the line sensing element corresponding to cell x is part of the foreground.

Figure 10:
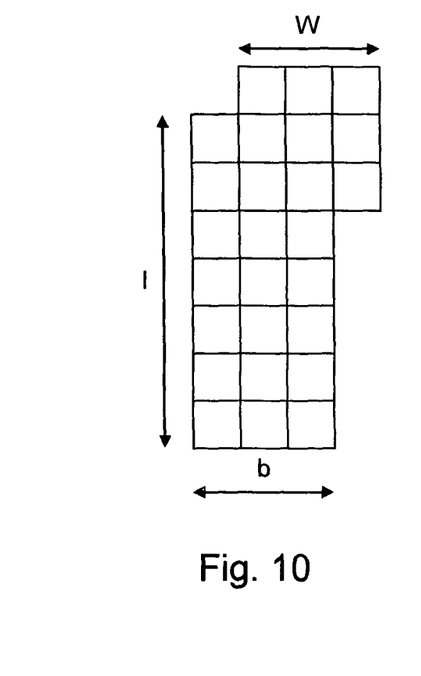
FIG. 10 illustrates a rectangular approximation of l×b cells for which the cuboid is projected on the same region $R_{ix}$ in the embodiment illustrated by FIG. 9.

The situation where $f_{ix}=1$ may be attributable to a person occupying any of the cells x which are sensed by the same sensing element of the light integrating line sensor. If $G_{ix}$ represents the total number of cells being projected on the light sensing element corresponding to cell x, for line sensor i of the network of N line sensors, these $G_{ix}$ positions will be approximately laid out in a trapezoid, which can be approximated by a rectangle R with dimensions l×b. Such a rectangular is illustrated by FIG. 10. Assuming that a person occupies a square of $W^2$ cells, as illustrated by the shaded cells in FIG. 10, this person can be in (l+W−1)×(b+W−1) different positions such that it overlaps with the rectangle R. A particular cell x in the rectangle R is only occupied in $W^2$ of all these positions. Hence, the probability $p(\mu_x = occ_x | O_i)$ is given by:

$$p(\mu_x = occ_x | O_i) = g_{ix} f_{ix} \qquad (9)$$

with:

$$g_{ix} = \frac{W^2}{(1+W-1)(b+W-1)} \qquad (10)$$

and:

$$p(\mu_x = nocc_x | O_i) = 1 - g_{ix} f_{ix} \qquad (11)$$

Substituting equation (6) in equation (3) yields:

$$p(\mu_x | O_1, \ldots, O_N) = \frac{p(\mu_x)}{p(O_1, \ldots, O_N)} \prod_{i=1}^{N} \frac{p(\mu_x | O_i) p(O_i)}{p(\mu_x)} \qquad (12)$$

with $p(\mu_x|O_i)$ being modeled as in equations (9) and (11). The probabilities $p(O_i)$ and $p(O_1, \ldots, O_N)$ do not depend on $\mu_x$ and hence are merely scaling factors that can be determined by imposing the property that a distribution should be normalized.

The expression (12) enables to efficiently calculate a 2D occupancy map from the scan lines generated by multiple light integrating line sensors. Such light integrating line sensor based occupancy system is ultra cheap, consumes very low-power, is privacy-friendly, very accurate and non-intrusive. The preferred probabilistic 2D occupancy map calculation method indeed yields very accurate ground occupancy detection results, and can be of wide use to the engineering community. Its applicability is not restricted to light integrating line sensor but can be extended to image cameras or other types of sensors.

Calculating ground occupancy maps is an important step in many algorithms for smart rooms, surveillance, video conferencing, sport games analysis, etc. 2D ground occupancy maps are also of particular use in home automation applications where they are used to regulate for example lighting, heating and ventilation. Furthermore they are used to retrieve statistical data of behavior of people. This is useful to detect abnormal events for example in elderly care situations or in public buildings or spaces. The statistical data are also useful in building design and architectural contexts. In video conferencing 2D occupancy maps are useful to control the expensive high-end video cameras and screens.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps,

The invention claimed is:

1. An optical system for occupancy sensing, comprising;
   a plurality of optical line sensors, each optical line sensor comprising a linear array of light sensing elements; and
   an optical light integrating device arranged to integrate light from rays with incidence angles subject to geometric constraints to be sensed by a light sensing element out of said light sensing elements,
   wherein said optical line sensors are arranged in position and with a viewing direction to sense intersecting areas thereby enabling to localize sensed objects on a two dimensional or three dimensional occupancy map.

2. The optical system for occupancy sensing according to claim 1, wherein a region in space containing said rays with incidence angles subject to geometric constraints is frustum shaped, said optical light integrating device comprising a light passing aperture.

3. The optical system for occupancy sensing according to claim 1, wherein a region in space containing said rays with incidence angles subject to geometric constraints is centred along a two dimensional plane, said plane comprising said light sensing element and being oriented along a predefined viewing direction and a direction of integration.

4. The optical system for occupancy sensing according to claim 1, wherein said optical light integrating device comprises a light passing slit oriented substantially perpendicular to said optical line sensor.

5. The optical system for occupancy sensing according to claim 1,
   wherein said optical system is arranged to sense occupancy in a room; and
   wherein said room is substantially rectangular and said plurality of optical line sensors comprises two optical line sensors respectively mounted in different corners of said room adjacent to a long wall of said room.

6. The optical system for occupancy sensing according to claim 1,
   wherein said optical system is arranged to sense occupancy in a room; and
   wherein said room is substantially rectangular and said plurality of optical line sensors comprises three optical line sensors respectively mounted in different corners of said room.

7. The optical system for occupancy sensing according to any claim 1,
   wherein said optical system is arranged to sense occupancy in a room; and
   wherein said room is substantially rectangular and said plurality of optical line sensors comprises four optical line sensors respectively mounted in two opposite corners of said room, and along opposite long walls of said room adjacent to said two opposite corners.

8. The optical system for occupancy sensing according to claim 1,
   wherein said optical system is arranged to sense occupancy in a room; and
   wherein each optical line sensor is mounted on a wall within said room at a height between 0 cm and a minimum height of an object to be detected.

9. The optical system for occupancy sensing according to claim 1, comprising
   a processor configured to receive data output by at least one of said optical line sensors, either directly or indirectly, and arranged to process said data according to a background/foreground processing algorithm enabling calculation of occupancy.

10. The optical system for occupancy sensing according to claim 9,
    wherein said processor is configured to generate a two dimensional occupancy map from data received from N of said optical line sensors, using the probability function:

$$p(\mu_x | O_1, \ldots, O_N) = \frac{p(\mu_x)}{p(O_1, \ldots, O_N)} \prod_{i=1}^{N} \frac{p(\mu_x | O_i) p(O_i)}{p(\mu_x)}$$

with:
   x representing a discrete base cell on a ground plane;
   $\mu_x$ representing an occupancy parameter that has a first value $occ_x$ when cell x is occupied and a second value $nocc_x$ when cell x is not occupied;
   $O_i$ representing an observation by optical line sensor i, with i being an integer value ranging from 1 to N;
   $p(O_1, \ldots, O_N)$ representing a probability of observations $O_1, \ldots, O_N$ by said N optical line sensors;
   $p(\mu_x)$ representing a probability for occupancy/non-occupancy of said cell x;
   $p(O_i)$ representing a probability for observation $O_1$ by optical line sensor i; and
   $p(\mu_x | O_i)$ representing a probability mass function of said occupancy parameter $\mu_x$ given an observation $O_i$ by optical line sensor i.

11. The optical system for occupancy sensing according to claim 10, wherein said processor is further configured to calculate $p(\mu_x | O_i)$ by:

$$p(\mu_x = occ_x | O_i) = g_{ix} f_{ix} \text{ and } p(\mu_x = nocc_x | O_i) = 1 - g_{ix} f_{ix}$$

with:
   $f_{ix}$ representing a fraction of foreground pixels; and
   $g_{ix}$ being determined by:

$$g_{ix} = \frac{W^2}{(1 + W - 1)(b + W - 1)}$$

with:
   W representing the average number of cells a person or object is occupying in each direction;
   l representing the length in number of cells of an approximately rectangular region on the ground plane that is projected on a light sensing element; and
   b representing the width in number of cells of said approximately rectangular region on the ground plane that is projected on a light sensing element.

12. The optical system for occupancy sensing according to claim 9, wherein said processor is configured to receive and process data from plural shots in time taken by at least one of said optical line sensors or from plural shots in time of an occupancy map.

13. A method for occupancy sensing, comprising the steps:
providing a plurality of optical line sensors, each optical line sensor comprising a linear array of light sensing elements;
integrating light from rays with incidence angles subject to geometric constraints to be sensed by a light sensing element out of said light sensing elements; and
sensing by said optical line sensors intersecting areas thereby enabling to localize sensed objects on a two dimensional or three dimensional occupancy map.

\* \* \* \* \*